Figure 1:
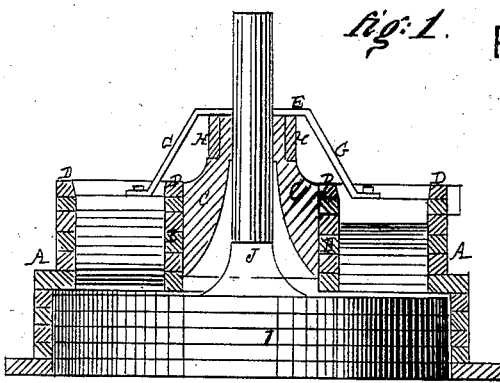
Figure 2:
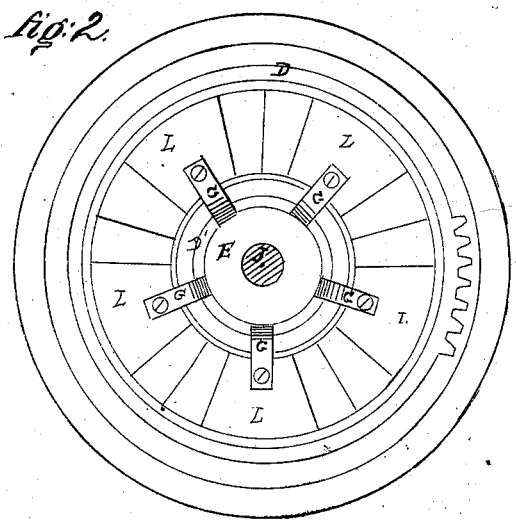
Figure 3:
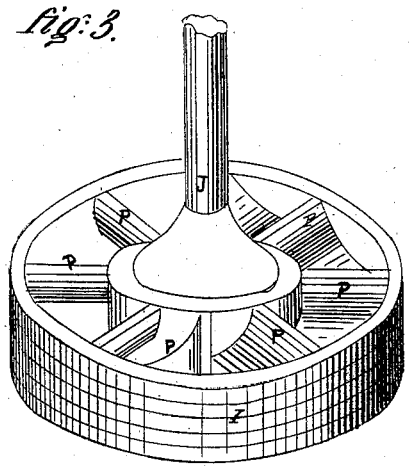

F. R. Ferris' Turbine Water Wheel.

74903

PATENTED FEB 25 1868

Witnesses.
C. H. Blue.
A. N. Mar

Inventor
F. R. Ferris
per
Alexander Mason
atty

United States Patent Office.

F. R. FERRIS, OF DORA, INDIANA.

Letters Patent No. 74,903, dated February 25, 1868.

IMPROVEMENT IN WATER-WHEELS.

The Schedule referred to in these Letters Patent and making part of the same.

TO ALL WHOM IT MAY CONCERN:

Be it known that I, F. R. FERRIS, of Dora, in the county of Wabash, and in the State of Indiana, have invented certain new and useful Improvements in Turbine Water-Wheel; and do hereby declare that the following is a full, clear, and exact description thereof, reference being had to the accompanying drawings, and to the letters of reference marked thereon.

In the annexed drawings making part of this specification, A represents a water-wheel case for a turbine or horizontal wheel, which is made about twice as deep as the wheel itself. Secured in the upper half of this case is a rim-wheel, B, which has within it, and extending a little above it, a hub, C. The rim-wheel B is made sufficiently smaller than the case A, (less in diameter,) than the space between the two will be equal to the width of the buckets of the wheel. A series of inclined spiral chutes is secured between the rim B and the case, for the purpose of conducting the water down to the buckets of the wheel. The number of these chutes corresponds with the number of buckets in the wheel, and their mouths are closed by means of a series of gates, L L, which is secured between the two rims D and D'. The outer rim, D, rests upon the upper edge of the case, and the inner one, D', rests upon the upper edge of the rim B. The gates L are connected by a series of arms, G G, to a collar, E, which surrounds the wheel-shaft J. Teeth are formed upon one portion of the periphery of rim D, into which a suitable gear-wheel may mesh to move said rim, and with it the gates. Surrounding the upper end of hub C is a clutch-collar, H, and the collar E rests upon it. By partially revolving the collar H the gates are slightly raised, so that they can be easily opened or closed. I represents the wheel, which is provided with a series of inclined spiral buckets, P P, and the vertical shaft J. The shaft J passes up through the collar E and hub C. The chutes in the case conduct the water to the buckets P P, said buckets receiving not only the direct percussive-stroke of the water, but also the back-action from the weight of the water. The shaft J has its lower bearing in a suitable step, and its upper bearing in the hub J.

Having thus fully described my invention, what I claim as new, and desire to secure by Letters Patent, is—

The collar H, in combination with the collar E, arms G, and gates L L, the same being used substantially as and for the purpose set forth.

In testimony that I claim the foregoing, I have hereunto set my hand, this 23d day of November, 1867.

F. R. FERRIS.

Witnesses:
P. E. DUGAN,
JOHN H. PEFLEY.